United States Patent [19]

Plavac

[11] Patent Number: 4,728,451
[45] Date of Patent: Mar. 1, 1988

[54] LUBRICATING OIL COMPOSITIONS CONTAINING POLY(OXYALKYLENE) AMINOETHER CARBAMATES AS DISPERSING AGENTS

[75] Inventor: Frank Plavac, Pinole, Calif.

[73] Assignee: Chevron Research Company, San Francisco, Calif.

[21] Appl. No.: 429,693

[22] Filed: Sep. 30, 1982

[51] Int. Cl.$^4$ .......................... C10M 145/26
[52] U.S. Cl. .................................. 252/51.5 A
[58] Field of Search ..................... 252/51.5 A

[56] References Cited

U.S. PATENT DOCUMENTS

| | | | |
|---|---|---|---|
| 2,998,445 | 8/1961 | Stewart et al. | 252/51.5 A X |
| 3,359,303 | 12/1967 | Coker | 560/159 |
| 3,454,625 | 7/1969 | Eiseman | 560/159 |
| 4,160,648 | 7/1979 | Lewis et al. | 44/63 |
| 4,160,694 | 7/1979 | Lewis et al. | 44/71 |
| 4,163,088 | 7/1979 | Kunzel | 560/159 |
| 4,191,537 | 3/1980 | Lewis et al. | 44/71 |
| 4,197,409 | 4/1980 | Lilburn | 252/51.5 A X |
| 4,198,306 | 4/1980 | Lewis | 252/51.5 A X |
| 4,233,168 | 11/1980 | Lewis et al. | 252/51.5 A |
| 4,247,301 | 1/1981 | Honnen | 44/72 X |
| 4,274,837 | 6/1981 | Lilburn | 44/71 |
| 4,294,714 | 10/1981 | Lewis et al. | 44/71 |
| 4,329,240 | 5/1982 | Lilburn | 252/51.5 A |

*Primary Examiner*—William R. Dixon, Jr.
*Assistant Examiner*—Cynthia A. Prezlock
*Attorney, Agent, or Firm*—S. R. LaPaglia; R. C. Gaffney; J. J. DeYoung

[57] ABSTRACT

Lubricating oil compositions containing additives for dispersancy and detergency are provided. The additives are poly(oxyalkylene) aminohydrocarbyloxyhydrocarbyl carbamates, also referred to as polyether aminoether carbamates.

11 Claims, No Drawings

LUBRICATING OIL COMPOSITIONS CONTAINING POLY(OXYALKYLENE) AMINOETHER CARBAMATES AS DISPERSING AGENTS

BACKGROUND OF THE INVENTION

Field of the Invention

This application relates to lubricating oil compositions containing hydrocarbylpoly(oxyalkylene) aminohydrocarbyloxyhydrocarbyl carbamates which contribute dispersancy and detergency to the compositions.

Lubricating oil compositions, particularly for use in internal combustion engines, have long performed many functions other than simply lubricating moving parts. Modern-day, highly compounded lubricating oil compositions provide antiwear, antioxidant, extreme-pressure and anti-rust protection in addition to maintaining the cleanliness of the engine by detergency and dispersancy. Many lubricating oil additives are well known for accomplishing these functions. For maintaining engine cleanliness, a well-known class of ashless detergents which have been found to be particularly useful are poly(oxyalkylene) carbamates. U.S. Pat. Nos. 4,160,648 and 4,247,301 disclose and claim fuel compositions containing certain poly(oxyalkylene) aminocarbamates and poly(oxyalkylene) polyamines as deposit control additives. While, in general, deposit control additives are not believed to be useful dispersants for lubricating oil compositions, certain aminocarbamates and certain polyamines are useful in this regard.

SUMMARY OF THE INVENTION

It has been found that improved lubricating oil compositions comprise a major amount of an oil of lubricating viscosity and an amount sufficient to provide dispersancy of hydrocarbylpoly(oxyalkylene) aminohydrocarbyloxyhydrocarbyl carbamates of molecular weight from about 500 to about 10,000, and preferably from about 500 to about 5,000 and having at least one basic nitrogen atom; wherein said poly(oxyalkylene) moiety is composed of oxyalkylene units selected from to 2 to 5 carbon oxyalkylene units and containing at least sufficient branched-chain oxyalkylene units to render said carbamate soluble in said lubricating oil composition. The poly(oxyalkylene) moiety is hydrocarbyl-terminated or "capped" and is bonded through a carbamate linkage or connecting group to an aminohydrocarbyloxyhydrocarbyl moiety ordinarily comprising an amino group at either end of said moiety separated by ether sub-moieties containing from between 2 to 60 carbon atoms and from 1 to 10 oxygen atoms.

DETAILED DESCRIPTION OF THE INVENTION

The present invention herein consists of a poly(oxyalkylene) aminoether carbamate, and a lubricating oil composition containing a major amount of oil of lubricating viscosity and from about 0.01 to about 5 weight percent of said additive. The poly(oxyalkylene) aminoether carbamate has a molecular weight of from about 500 to about 10,000 and preferably from about 500 to about 5,000. The composition consists of three parts or moieties. One is the aminohydrocarbyloxyhydrocarbyl moiety, the second is the poly(oxyalkylene) moiety comprising at least one hydrocarbyl-terminated poly(oxyalkylene) polymer, bonded together through the third moiety or connecting group, a carbamate linkage, i.e.,

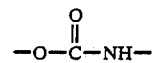

As a dispersant, the poly(oxyalkylene) moiety and the aminoether moiety are selected to provide solubility in the oil composition and dispersant activity without contributing to deposit formation. The additives may be termed hydrocarbylpoly(oxyalkylene) aminohydrocarbyloxyhydrocarbyl carbamates, or for convenience, "polyether aminoether carbamates". The additives may be prepared from the reaction of a poly(oxyalkylene)-chloroformate with the appropriate diaminoether such as 4,9-dioxadodecane-1,12-diamine to form the active composition.

Poly(oxyalkylene) Moiety

The hydrocarbyl-terminated poly(oxyalkylene) polymers which are utilized in preparing the carbamates of the present invention are monohydroxy compounds, i.e., alcohols, often termed monohydroxy polyethers, or polyalkylene glycol monohydrocarbylethers, or "capped" poly(oxyalkylene) glycols and are to be distinguished from the poly(oxyalkylene) glycols, or polyols, which are not hydrocarbyl-terminated, i.e., not capped. The hydrocarbyl-terminated poly(oxyalkylene) alcohols are produced by the addition of lower alkylene oxides, such as oxirane, ethylene oxide, propylene oxide, the butylene oxides, or the pentylene oxides to the hydroxy compound ROH under polymerization conditions, wherein R is the hydrocarbyl group which caps the poly(oxyalkylene) chain. Methods of production and properties of these polymers are disclosed in U.S. Pat. Nos. 2,841,479 and 2,782,240, and Kirk-Othmer's "Encyclopedia of Chemical Technology", Volume 19, p. 507. In the polymerization reaction, a single type of alkylene oxide may be employed, e.g., propylene oxide, in which case the product is a homopolymer, e.g., a poly(oxypropylene) propanol. However, copolymers are equally satisfactory and random copolymers are readily prepared by contacting the hydroxyl-containing compound with a mixture of alkylene oxides, such as a mixture of propylene and butylene oxides. Block copolymers of oxyalkylene units also provide satisfactory poly(oxyalkylene) polymers for the practice of the present invention.

In general, the poly(oxyalkylene) polymers are mixtures of compounds that differ in polymer chain length. However, their properties closely approximate those of the polymer represented by the average composition and molecular weight.

The hydrocarbylpoly(oxyalkylene) moiety of the carbamate consists of one or more hydrocarbyl-terminated poly(oxyalkylene) polymers composed of oxyalkylene units containing from 2 to about 5 carbon atoms. The polymers are bound to the carbamate via the oxygen atom of carbamate linkages, and the poly(oxyalkylene) moiety consists of at least one such poly(oxyalkylene) polymer. The hydrocarbyl group contains from 1 to about 30 carbon atoms, preferably from 2 to about 20 carbon atoms. Preferably the oxyalkylene units contain from 3 to 4 carbon atoms and the molecular weight of the hydrocarbylpoly(oxyalkylene) moiety is from about 500 to about 10,000, more preferably from about 500 to about 5,000. Each poly(oxyalkylene) polymer contains at least 5 oxyalkylene units, preferably 8 to about 100 oxyalkylene units, more preferably about 10 to 100 units and most preferably 10 to about 25 such units. In general, the oxyalkylene units may be branched or unbranched. Preferably the poly(oxyalkylene) polymer chain contains at least some $C_3$–$C_5$ oxyalkylene units, more preferably branched $C_3$–$C_5$ oxyalkylene units are present in at least sufficient number to render the carbamate soluble in hydrocarbon oils of lubricating viscosity to the extent of at least 0.01 to 5 weight percent. A poly(oxyalkylene) polymer chain composed of branched three and/or four carbon oxyalkylene units in at least sufficient amount to effect solubility in a lubricating oil composition is most preferred. The preferred poly(oxyalkylene) compounds are composed, at least in part, of the branched oxyalkylene isomers, particularly oxypropylene, and oxybutylene units which are obtained from 1,2-propylene oxide and from 1,2-butylene oxide, respectively.

The hydrocarbyl moiety (R—) which terminates the poly(oxyalkylene) chain contains from 1 to about 30 carbon atoms, preferably from 2 to about 20 carbon atoms, and is generally derived from the monohydroxy compound (ROH) which is the initial site of the alkylene oxide addition in the polymerization reaction. Such monohydroxy compounds are preferably aliphatic or aromatic alcohols of from 1 to about 30 carbon atoms, more preferably an alkanol or an alkylphenol, and most preferably an alkylphenol wherein the alkyl is a straight- or branched-chain of from 1 to 24 carbon atoms. The hydrocarbyl component of the poly(oxyalkylene) moiety preferably denotes an organic radical composed of carbon and hydrogen which may be aliphatic, alicyclic, aromatic or combinations thereof, i.e., aralkyl. Preferably, the hydrocarbyl group will be relatively free of aliphatic unsaturation, i.e., ethylenic and acetylenic, particularly acetylenic unsaturation.

Aminohydrocarbyloxyhydrocarbyl Moiety

The aminohydrocarbyloxyhydrocarbyl moiety, also referred to as the aminoether moiety, of the polyether aminoether carbamate is preferably derived from a diamine having an amino group (or amine nitrogen atom) at either end of the molecule and separated by a hydrocarbyloxyhydrocarbyl sub-moiety. The diamine is preferably reacted with a hydrocarbylpoly(oxyalkylene)chloroformate to produce the hydrocarbylpoly(oxyalkylene) aminohydrocarbyloxyhydrocarbyl carbamate finding use within the present invention. Preferably, the diamine provides the product polyether aminopolyether carbamate with, on the average, at least one basic nitrogen atom per carbamate molecule, i.e., a nitrogen atom titratable by a strong acid.

The diaminoether moiety may be represented by the formula:

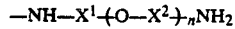

$$-NH-X^1+O-X^2+_nNH_2$$

within which the ether sub-moiety is represented by $-X^1+O-X^2+_n$. In the ether sub-moiety, $X^1$ and $X^2$ represent linking groups selected from (A) linear, cyclic, or branched alkylene groups containing 1 to 6 carbon atoms; or (B) arylene groups of from 6 to 12 carbon atoms. These groups may also be optionally substituted with 1 or 2 groups selected from (C) hydroxyl, alkoxyl, alkyl alkoxyl, nitrile, amino, or thio, or any alkyl or alkaryl group also substituted with these functional groups. Although the above (C) substituents are strictly not hydrocarbyl in nature, the term "hydrocarbyl" will be used to refer to the $X^1$ and $X^2$ groups in the aminohydrocarbyloxyhydrocarbyl moiety for the sake of ease in nomenclature and because the preferred embodiments of the invention are composed of either group (A) or (B) components. Although $X^1$ and $X^2$ are selected from the same groups of substituents, they are independent one from the other and may be the same or different. They may also be selected from different groups, i.e., one from (A) and one from (B) in the same molecule, although preferably they will be selected from the same group. "n" represents the number of repeating subgroups within the ether sub-moiety and is from 1 to 10. The molecule is so structured that within the aminoether moiety, the nitrogen atoms at either end of the moiety are only bonded to carbon atoms in the ether submoieties, not to an oxygen atom.

The more preferred diaminoethers finding use within the scope of the present inventions are alkylene ether diamines. Preferably the diaminoethers contain from 2 to 60 carbon atoms, more preferably each of the ether sub-moieties contains 4 to 16 carbon atoms. The number of oxygen atoms in the ether sub-moiety ranges from 1 to 10 but is more preferably from 1 to 4. Typical diaminoethers examples which illustrate the present invention include: 3-Oxapentane-1,5-diamine; 3,6-Dioxaoctane-1,8-diamine; 3,6,9-Trioxaundecane-1,11-diamine; 4,9-Dioxadodecane-1,12-diamine; and 4,7,10-Trioxatridecane-1,13-diamine.

As detailed above, the $X^1$ and $X^2$ sub-groups of the ether sub-moiety may also be substituted with arylene groups and/or alkylene and arylene groups substituted with the functional groups selected from group (C) above. Examples of those compounds would include: 4,4-Diaminodiphenyl ether and 4,9-Dioxadodecane-11-hydroxy-1,12-diamine.

Hydrocarbylpoly(oxyalkylene) Aminohydrocarbyloxyhydrocarbyl Carbamate

Having described the diaminoether component and the poly(oxyalkylene) component, the poly(oxyalkylene) aminoether carbamate dispersing agent of the present invention is obtained by linking these components together through a carbamate linkage, i.e.

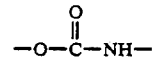

$$-O-\overset{O}{\underset{\|}{C}}-NH-$$

wherein the oxygen may be regarded as the terminal hydroxyl oxygen of the poly(oxyalkylene) alcohol component, and the carbonyl group, —C(O)— is preferably provided by the coupling agent, e.g. phosgene.

The poly(oxyalkylene) aminoether carbamate of the present invention preferably has at least one basic nitrogen atom per molecule. A "basic nitrogen atom" is one that is titratable by a strong acid, e.g., a primary, secondary, or tertiary amino nitrogen, as distinguished from, for example, amido nitrogen,

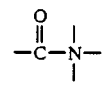

$$-\overset{O}{\underset{\|}{C}}-\overset{|}{\underset{|}{N}}-$$

which is not as titratable. Preferably, the basic nitrogen atom is in a primary or secondary amino group.

The preferred poly(oxyalkylene) aminoether carbamate has a molecular weight of from about 500 to 10,000 [representing an average maximum distribution of poly(oxyalkylene) polymer in the compound] and more preferably from about 500 to about 5,000.

The class of preferred carbamates may be described by the following general formula:

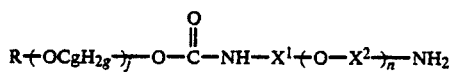

wherein n is an integer from 1 to 10;
g is an integer from 2 to 5;
j is an integer such that the molecular weight of the compound is in the range of about 500 to about 5,000;
R is a hydrocarbyl group of from 1 to 30 carbon atoms;
$X^1$ and $X^2$ are the same or different substituents selected from the groups consisting of the aforementioned (A), (B), and (C); and
$X^2$ can vary independently up to n number of times, each independent $X^2$ substituent being selected from the groups consisting of the aforementioned (A), (B), and (C);
and at least a sufficient number of oxyalkylene units ($OC_gH_{2g}$) are branched-chain oxyalkylene units to render said compound soluble in hydrocarbon oils of lubricating viscosity. Preferably j is about 5 to 25, g is 4, and n is 1 to 4.

Preparation of the Poly(oxyalkylene) Aminoether Carbamates

The dispersing agents of this invention may be most conveniently prepared by first reacting the appropriate hydrocarbylpoly(oxyalkylene) alcohol with phosgene to produce a hydrocarbylpoly(oxyalkylene)chloroformate. The chloroformate is then reacted with the appropriate diaminoether as detailed above in the presence of a tertiary amine base, e.g., triethylamine, to produce the appropriate poly(oxyalkylene) aminoether carbamate.

The reaction of the poly(oxyalkylene) compound and phosgene is usually carried out on an essentially equimolar basis, although excess phosgene can be used to improve the degree of reaction. The reaction may be carried out at temperatures from −10° to 100° C., preferably in the range of 0° to 50° C. The reaction will usually be complete within ¼ to 5 hours. Times of reaction will usually be in the range of from 2 to 4 hours.

A solvent may be used in the chloroformylation reaction. Suitable solvents include benzene, toluene, etc.

The reaction of the resultant chloroformate with the amine may be carried out neat or preferably in solution. Temperatures of from −10° to 200° C. may be utilized, the desired product may be obtained by water wash and stripping, usually by the aid of vacuum, of any residual solvent.

The mol ratio of the basic amine nitrogen to polyether chloroformate will generally be in the range from about 2 to 20 mols of basic amine nitrogen per mol of chloroformate, and more usually 5 to 15 mols of basic amine nitrogen per mol of chloroformate. Since suppression of polysubstitution of the diaminoethers is usually desired, large molar excesses of the diamine will be used. Additionally, the preferred adduct is the monocarbamate compound, as opposed to the bis(carbamate) or disubstituted aminoethers.

The reaction or reactions may be conducted with or without the presence of a reaction solvent. A reaction solvent is generally employed whenever necessary to reduce the viscosity of the reaction product. These solvents should be stable and inert to the reactants and reaction product. Depending on the temperature of the reaction, the particular chloroformate used, the mol ratios, as well as the reactant concentrations, the reaction time may vary from less than 1 minute to 3 hours.

After the reaction has been carried out for a sufficient length of time, the reaction mixture may be subjected to extraction with a hydrocarbon-water or hydrocarbon-alcohol-water medium to free the product from any low-molecular-weight amine salts which have formed and any unreacted diamine. The product may then be isolated by evaporation of the solvent. Further purification may be effected by column chromatography on silica gel.

Lubricating Oil Compositions

The lubricating oil compositions of the invention are useful for lubricating internal combustion engines. The lubricating oils not only lubricate the engine, but, because of their dispersancy properties, help maintain a high degree of cleanliness of the lubricated parts.

Suitable lubricating oils which can be used to prepare a lubricating oil composition or concentrate of this invention are oils of lubricating viscosity derived from petroleum or synthetic sources. The oils can be paraffinic, naphthenic, halo-substituted hydrocarbons, synthetic esters, polyethers, alkylbenzenes, or combinations thereof. Oils of lubricating viscosity have viscosities in the range of 35 to 50,000 Saybolt Universal Seconds (SUS) at 100° F., and more usually from about 50 to 10,000 SUS at 100° F. The amount of the diaminoether carbamate of this invention which is incorporated into the lubricating oil to provide the effective amount necessary for dispersancy varies widely with the particular diaminoether carbamate used as well as the use intended for the lubricating oil composition. Other conventional additives which can be used in combination with the poly(oxyalkylene) aminoether carbamates of this invention include ashless dispersants such as the type disclosed in U.S. Pat. Nos. 3,172,892, 3,219,666, 3,381,022; neutral and basic calcium, barium and magnesium petrosulfonates or alkyl phenates; oxidation inhibitors, antifoam agents, viscosity index improvers, pour-point depressants, and the like such as chlorinated wax, benzyldisulfide, sulfurized sperm oil, sulfurized terpene; phosphorus esters such as trihydrocarbon phosphites and phosphates; metal thiocarbamates such as zinc dioctyldithiocarbamate; metal phosphorus dithioates such as zinc dioctylphosphorodithioate; and polyisobutene having an average molecular weight of 100,000.

In general, the lubricating oil compositions will contain from about 0.01 to about 20 weight percent of said oil-soluble aminoether carbamate. More usually, the lubricating oil composition of the invention will contain from about 0.5 to about 10 weight percent of the aminoether carbamate and even more usually from about 1 to about 8 weight percent of the aminoether carbamate.

EXAMPLES

The following examples are presented to illustrate specific embodiments of the practice of this invention and should not be interpreted as limitations upon the scope of the invention.

EXAMPLE 1

Reaction of Alkylphenolpoly(oxybutylene)chloroformate With 4,9-Dioxadodecane-1,12-diamine 4,9-Dioxadodecane-1,12-diamine (34 g, 0.167 mol) was dissolved in 500 ml of ether. The solution was cooled to 0° C. and triethylamine (9.3 ml, 0.067 mol) was added. A solution of alkylphenylpoly(oxybutylene)chloroformate (50 g, 0.033 mol) dissolved in 300 ml of ether was added dropwise over a 1-hour period. The reaction mixture was then stirred at room temperature for 20 hours. Potassium carbonate was then added. The mixture was filtered and the solvent was removed under vacuum. This material was taken up with excess petroleum ether and washed with four portions of water. The organic layer was dried over potassium carbonate and filtered. Solvent removal under vacuum gave 51.8 g of yellow oil.

This material was column chromatographed on silica gel using 1:4 methanol/methylene chloride to elute. 20.2 g of clear oil was obtained (Rf=0.18). The product contained 1.51% nitrogen and 0.79% basic nitrogen. The product showed a strong carbamate absorption at 1725 $cm^{-1}$.

EXAMPLE 2

Reaction of Alkylphenolpoly(oxybutylene)chloroformate With 4,7,10-Trioxatridecane-1,13-diamine 4,7,10-Trioxatridecane-1,13-diamine (35 g, 0.16 mol) was dissolved in 500 ml of ether. The solution was cooled to 0° C. and triethylamine (9.3 ml, 0.067 mol) was added. A solution of alkylphenolpoly(oxybutylene)chloroformate (50 g, 0.033 mol) dissolved in 500 ml of ether was added dropwise over a 1-hour period. The reaction mixture was then stirred at room temperature for 20 hours. Potassium carbonate was then added. The mixture was filtered and the solvent was removed under vacuum. This material was taken up with excess petroleum ether and washed with four portions of saturated brine. The organic layer was dried over potassium carbonate and filtered. Solvent removal under vacuum gave 54 g of yellow oil.

This material was column chromatographed on silica gel using 1:4 methanol/methylene chloride to elute. 20 g of clear oil was obtained (Rf=0.18). The product contained 1.42% nitrogen and 0.73% basic nitrogen. The product showed a strong carbamate absorption at 1725 $cm^{-1}$.

EXAMPLE 3

Reaction of Alkylphenolpoly(oxybutylene)chloroformate With 4,4'-diaminodiphenyl Ether 4,4'-Diaminodiphenyl ether (20 g, 0.1 mol) was dissolved in 500 ml of acetone and 20 ml of pyridine. A drying tube and dropping funnel were attached. A solution of alkylphenolpoly(oxybutylene)chloroformate (50 g, 0.033 mol) dissolved in 100 ml of acetone was added slowly dropwise over a period of 30 minutes. The reaction mixture was stirred at room temperature for 24 hours. The solvent was removed under vacuum and the residue was stripped several times with toluene. The residue was then taken up in excess petroleum ether. Potassium carbonate was added and the mixture was filtered. The filtrate was washed twice with saturated sodium bicarbonate and dried over potassium carbonate. The solution was filtered and stripped several times with toluene. Complete solvent removal under vacuum gave 46 g of clear amber oil.

This material was column chromatographed on silica gel using 30% ethyl acetate/hexane to elute. 19.3 g of clear oil was obtained (Rf=0.33). The product contained 1.40% nitrogen and 0.70% basic nitrogen. The product showed a strong carbamate absorption at 1745 $cm^{-1}$.

The specific embodiments of the invention having been described in detail, it should be understood that the invention is to be given broadest possible interpretation within the terms the following claims.

What is claimed is:

1. A lubricating oil composition comprising a major portion of oil of lubricating viscosity, and a minor amount of poly(oxyalkylene) aminohydrocarbyloxyhydrocarbyl carbamate having a molecular weight of about 500 to 10,000;

wherein the poly(oxyalkylene) moiety of said carbamate is comprised of oxyalkylene units selected from $C_2$-$C_5$ oxyalkylene units of which a sufficient number are branched-chain oxyalkylene units to render said carbamates soluble in lubricating oil; and said aminohydrocarbyloxyhydrocarbyl moiety of said carbamate being derived from a diaminoether having from 2 to 60 carbon atoms.

2. A lubricating oil composition comprising a major portion of oil of lubricating viscosity, and a minor amout of poly(oxyalkylene aminohydrocarbyloxyhydrocarbyl carbamate having a molecular weight of about 500 to 10,000;

wherein the poly(oxyalkylene) moiety of said carbamate is composed of oxyalkylene units selected from $C_2$-$C_5$ oxyalkylene units of which a sufficient number are branched-chain oxyalkylene units to render said carbamates soluble in liquid hydrocarbons; and said aminohydrocarbyloxyhydrocarbyl moiety of said carbamate being derived from a diaminoether having from 4 to 16 carbon atoms and within which the ether component of the diaminoether is composed of substituents selected from (A) alkylene groups containing 1 to 6 carbon atoms; (B) arylene groups containing from 6 to 12 carbon atoms; and (C) groups selected from (A) or (B) and substituted with groups selected from (1) hydroxyl, (2) alkoxyl, (3) nitrile, (4) amino, (5) thio, and (6) alkyl or aryl groups substituted with substituents selected from hydroxyl, alkoxyl, nitrile, amino, and thio groups.

3. The lubricating oil composition of claim 1 or 2 wherein said poly(oxyalkylene) moieties of said carbamates are hydrocarbyl-terminated, said hydrocarbyl group containing from about 1 to 30 carbon atoms.

4. The lubricating oil composition of claim 1 or 2 wherein said carbamates have a molecular weight of about 500 to 5,000.

5. The lubricating oil composition of claim 1 or 2 wherein said carbamates have a molecular weight of about 1,200 to 5,000.

6. The lubricating oil composition of claim 1 or 2 wherein the oxyalkylene units of said poly(oxyalkylene) moiety are oxybutylene units.

7. The lubricating oil composition of claim 2 wherein said ether substituent is a polyalkyl ether.

8. The lubricating oil composition of claim 2 wherein said diaminoether is selected from 4,9-dioxadodecane-1,12-diamine; 4,7,10-trioxatridecane-1,13-diamine; and 4,4'-diaminodiphenyl ether.

9. A lubricating oil composition comprising a major portion of oil of lubricating viscosity and a minor amount of a compound having the formula:

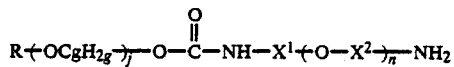

wherein n is an integer from 1 to 10; g is an integer from 2 to 5; j is an integer such that the molecular weight of the compound is in the range of about 500 to 5,000; R is a hydrocarbyl group of from about 1 to 30 carbon atoms; and $X^1$ and $X^2$ are the same or different substituents selected from the group consisting of (A) alkylene groups containing 1 to 6 carbon atoms; (B) arylene groups of from 6 to 12 carbon atoms; and (C) groups selected from (A) and (B) and substituted with groups selected from hydroxyl, alkoxyl, nitrile, amino, thio, and alkyl and/or aryl groups substituted with substituents selected from hydroxyl, alkoxyl, nitrile, amino, and thio groups; and wherein $X^2$ can vary independently with the groups consisting of (A), (B), and (C) up to n times.

10. The lubricating oil composition as claimed in claim 9 wherein j is 5 to 25, g is 4, and n is 1 to 4.

11. The lubricating oil composition as claimed in claim 9 wherein $X^1$ and $X^2$ are alkyl groups of about 5 to 6 carbons and n is 2 to 3.

* * * * *